(12) United States Patent
Barnes et al.

(10) Patent No.: US 8,718,922 B2
(45) Date of Patent: May 6, 2014

(54) VARIABLE DENSITY DEPTHMAP

(75) Inventors: Craig R. Barnes, Forest Park, IL (US); Joseph P. Mays, Chicago, IL (US)

(73) Assignee: Navteq B.V., Veldhoven (NL)

( * ) Notice: Subject to any disclaimer, the term of this patent is extended or adjusted under 35 U.S.C. 154(b) by 261 days.

(21) Appl. No.: 13/192,897

(22) Filed: Jul. 28, 2011

(65) Prior Publication Data

US 2013/0030699 A1    Jan. 31, 2013

(51) Int. Cl.
*G06F 17/30* (2006.01)
(52) U.S. Cl.
USPC .......................................... 701/400; 348/143
(58) Field of Classification Search
USPC .......... 701/400, 408–410; 382/254–256, 276, 382/285, 286; 345/419; 348/143, 148, 161, 348/169
See application file for complete search history.

(56) References Cited

U.S. PATENT DOCUMENTS

| | | | |
|---|---|---|---|
| 5,629,626 A | | 5/1997 | Russell et al. |
| 5,742,924 A | * | 4/1998 | Nakayama ..................... 701/458 |
| 5,968,109 A | | 10/1999 | Israni et al. |
| 6,148,295 A | | 11/2000 | Megiddo et al. |
| 6,169,516 B1 | * | 1/2001 | Watanabe et al. ........ 342/357.51 |
| 6,703,947 B1 | | 3/2004 | Wallner |
| 7,689,621 B1 | | 3/2010 | Huber et al. |
| 2007/0071311 A1 | | 3/2007 | Rovira-Mas et al. |
| 2008/0143709 A1 | | 6/2008 | Fassero et al. |
| 2010/0079336 A1 | | 4/2010 | Skibiski et al. |
| 2010/0250109 A1 | | 9/2010 | Johnston et al. |
| 2011/0087425 A1 | | 4/2011 | Deng et al. |

OTHER PUBLICATIONS

International Search Report and Written Opinion from related International application No. PCT/US2012/47794 dated Oct. 16, 2012.
Zhang, et al. "Semantic Segmentation of Urban Scenes Using Dense Depth Maps." Center for Visualization and Virtual Environments, University of Kentucky, ECCV 2010, Part IV, LNCS 6314 pp. 708-721 (2010).
Moore. "An int[r]oductory tutorial on kd-trees." Extract from Andrew Moore's PhD Thesis r Efficient Memory-based Learning for Robot Control, Technical Report No. 209, Computer Laboratory, University of Cambridge, 20 pages (1991).
Wang, et al. "Automatic Natural Video Matting with Depth." University of California, Santa Cruz and University of Kentucky, 4 pages (2007).

* cited by examiner

*Primary Examiner* — Dalena Tran
(74) *Attorney, Agent, or Firm* — Lempia Summerfield Katz LLC

(57) ABSTRACT

One or more systems, devices, and/or methods for organizing spatial data are disclosed. For example, a method includes receiving a location data point from a navigation device. A controller compares the distance from each of a plurality of data points to the location data point. In constructing a depthmap that associates each of the data points with the distance from the location data point, the controller assign data points within a minimum distance from the location data point into a first cell and data points greater than the minimum distance from the location data point into a second cell. The second cell is larger than the first cell and corresponds to a larger geographic area than the first cell. The depthmap may be configured to position points of interest in a panoramic or street level view image.

19 Claims, 9 Drawing Sheets

150

VARIABLE DENSITY DEPTHMAP

BACKGROUND OF THE INVENTION

The present invention relates to maps and/or navigation and, more particularly, to method(s) and system(s) for constructing depthmaps for use in maps and/or navigation.

An example depthmap is a two-dimensional array including two-dimensional location information along with the array's element values as depth values. In other words, each point in a depthmap may have three coordinates. Two coordinates correspond to the location in the two-dimensional array, and the third is the depth at that location. A depthmap may resemble a gray scale image with the intensity values replaced by depth values.

Depthmaps may be used for a variety of image processing techniques. For example, the background of an image may be identified and removed to isolate the foreground image or to insert a new background. In addition, depthmaps may be used to add effects to an image such as fog or shadows. Depthmaps may also be used to add information to images.

SUMMARY OF THE INVENTION

According to one aspect, organizing spatial data is performed remotely by a server or locally by a navigation device. A controller receives a location data point from the navigation device and identifies a plurality of data points indexed by a distance from the location data point. The distance from each of the plurality of data points to the location data point are compared to a minimum distance. At least one data point within the minimum distance from the location data point is assigned to a first cell, and at least one data point greater than the minimum distance from the location data point is assigned to a second cell. The controller constructs a depthmap including the first cell and the second cell, wherein the second cell is larger than the first cell and/or covers a greater geographical area than the first cell. The depthmap is sent for display by the navigation device.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
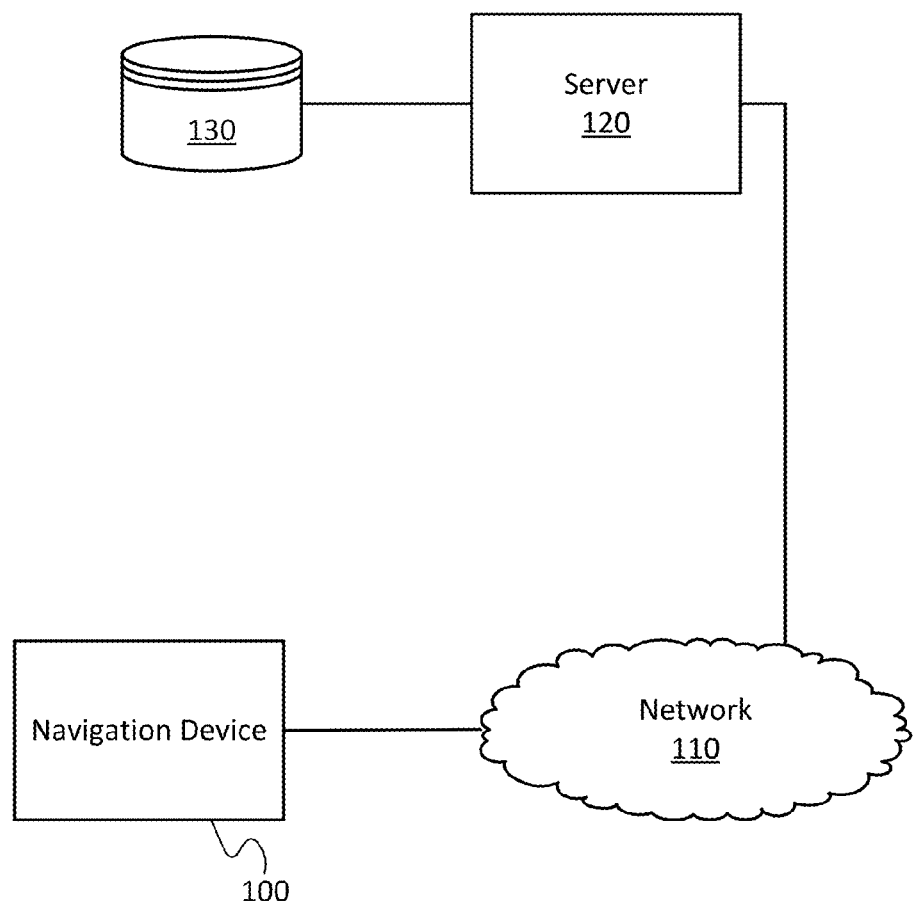
FIG. 1 illustrates an example embodiment of a navigation system.

Depthmaps of variable density include a higher density of depth values nearer a center location, which may correspond to the location of a user, and progressively lower density of depth values as the distance from the center increases. The variable density depthmaps may include two or more densities of depth values. The densities may be determined based on the distance of a particular location in the depth map to the user or based on an amount of information associated with a particular location in the depth map. Because fewer depthmap values are used, less data is required to store the depthmap. Therefore, the variable density reduces the amount of time, processing power, storage space, bandwidth for transmission, time for transmission, and/or time for decoding required to utilize depthmaps.

Depthmaps may be constructed from light detection and ranging (LIDAR) data. LIDAR, which may also be referred to as three dimensional laser scanning, employs one or more lasers or "cameras" to collect data points representing a surrounding area, such as an area about a road or walkway. A LIDAR device collects and gathers data points in a point cloud in which each data point corresponds to a local coordinate, such as (x, y, z), and is either on or off. Alternatively, the LIDAR data may be a grayscale point cloud including an intensity for each data point, ranging from 0 for black to 255 for white or vice versa. The point cloud may be stored in ASCII or LIDAR exchange format. The one or more lasers may be in a near infrared spectrum (such as about 700 nm to about 5000 nm or about 800 nm to about 2500 nm) or other light spectrum.

In one example algorithm for construction of a depthmap from LIDAR data, the LIDAR data may be rendered into a cube of any size. The center of the cube corresponds to the location of the LIDAR device when collecting the LIDAR data. A depthmap is derived from each face of the cube. The depthmap allows objects to be accurately placed on the images that correspond to views associated with the particular face of the cube. The object may be a point of interest tag such as label describing an address, a building, a landmark, a business, or other object visible in the image. Alternatively, the object may be an advertisement, a speed limit, a street name, or a landmark identifier. The images may be combined in a panoramic imagery such as that found in a street level navigation application or an augmented reality application. While the following description places the origin of the depthmap, street level navigation image, or augmented reality image as the location of a user or navigation device, the origin may also be a simulated location used to provide a perspective in a mapping application without the navigation device or the user actually being located at the origin.

In panoramic imagery some objects that are close to the center of the image or in the foreground of the image, which corresponds to locations near the user's location, are displayed to the user at a larger scale. These foreground objects are relatively farther apart and may be positioned precisely with respect to the objects' geographic locations. However, objects that are relatively distant from the center of the image or in the background of the image, are displayed to the user at a smaller scale. In other words, based on perspective, the foreground of the image includes less geographical area than the background of the image. Therefore, less precision is needed in placing objects in the background of the image. Accordingly, a less detailed depthmap is needed to store the location of objects closer to the background of the image. A variable density depthmap allows the locations of objects in one area of the image to be stored in a low resolution area of the depthmap and the locations of objects in another area of the image to be stored in a high resolution area of the depthmap.

FIG. 1 illustrates a navigation system 150 for constructing and displaying variable density depthmaps. The navigation system 150 includes a navigation device 100, a network 110, a server 120, and a database 130. The navigation device 100 may be a cellular telephone (smart phone), a personal digital assistant ("PDA"), a tablet computer, a laptop, a personal navigation device ("PND"), or any portable device.

The navigation device 100 or mobile device generates a location according to the geographic location of the navigation device 100. The location may be generated using positioning circuitry including one or more of a global navigation satellite system based on a satellite signal, a triangulation system that utilizes one or more terrestrial communication signals, a inertial position system based on sensors such as gyroscopes or accelerometers, and/or a or dead reckoning system based on a previously known position. The positioning circuitry may also determine an orientation using any of the above systems and/or a magnetic sensor such as a compass. The orientation and the location allow the appropriate variable density depthmap to be selected based on the perspective of the user at the current geographic location of the navigation device 100.

The database 130 stores depthmap data. The depthmap data comprises geographic coordinates paired with objects. The navigation device 100 communicates the location, which may include a single location data point, to the server 120 via network 110. The server 120 accesses the depthmap data from the database 130 to identifying a plurality of data points. The data points may be indexed by a distance from the location data point or the distance from the location data point may be calculated from the coordinates of the data points and the location data point.

The variable density depthmap is organized in a plurality of cells. The cells vary in size with respect to the geographic area that the cells represent. The server 120 compares the distance from each of the plurality of data points to the location data point to construct the variable density depthmap. The server 120 constructs the variable density depthmap by assigning or binning at least one of the plurality of data points within a minimum distance from the location data point into a first cell and assigning or binning a at least one of the plurality of data points greater than the minimum distance from the location data point into a second cell. The second cell is larger than the first cell, which means to second cell covers a greater geographic area than the geographic area covered by the first cell. The second cell may include a subset of the plurality of data points separated by a distance greater than that of the first cell. The server 120 sends the depthmap to the navigation device 100.

The depthmap constructed from the first cell and the second cell includes a low density region, which includes the second cell, and a high density region, which includes the first cell. The low density region includes fewer possible data points in the depthmap than in the high density region. The density of the cells, which directly determines the size of the cell, may be selected by a user of the server 120. For example, the server 120 may define the variable density depthmap such that for the first 10 meters from the reference location, cells are 1 meter by 1 meter, and for 10 meters to 100 meters from the reference location, cells are 5 meters by 5 meters. When objects are loaded into the depthmap, there are 100 possible coordinates (cells) in the depth map for the first 10 meter interval, and 396 possible coordinates for the interval from 10 meters to 100 meters, which totals 496 values to store in the depthmap. A conventional constant density depth map using 1 meter by 1 meter cells for the entire depthmap involves 10,000 values to store in the depthmap. In this simple example, variable density depthmaps involve reduction in storage and processing resources by a factor of 20.

The variable density depthmap provides a link between the panoramic or street level view image and points of interest associated with the plurality of data points so that the points of interest can be combined with the panoramic or street view image and displayed on the navigation device 100. The points of interest may be combined with the panoramic or street view image by the navigation device 100 or on the server 120. Alternatively, the variable density depthmap may be overlaid on the image.

The network 110 may include any combination of a cellular network, the Internet, or a local computer network. For example, the navigation device 100 may communicate with the network 110 wirelessly though protocols known as Wi-Fi, the protocols defined by the IEEE 802.11 standards, the protocols defined by the Bluetooth standards, or other protocols. Alternatively or in addition, the navigation device 100 may communicate with the network 110 wirelessly as a cellular network such as a Global System for Mobile Communication (GSM) or other third generation (3G) or fourth generation (4G) networks.

Figure 2:
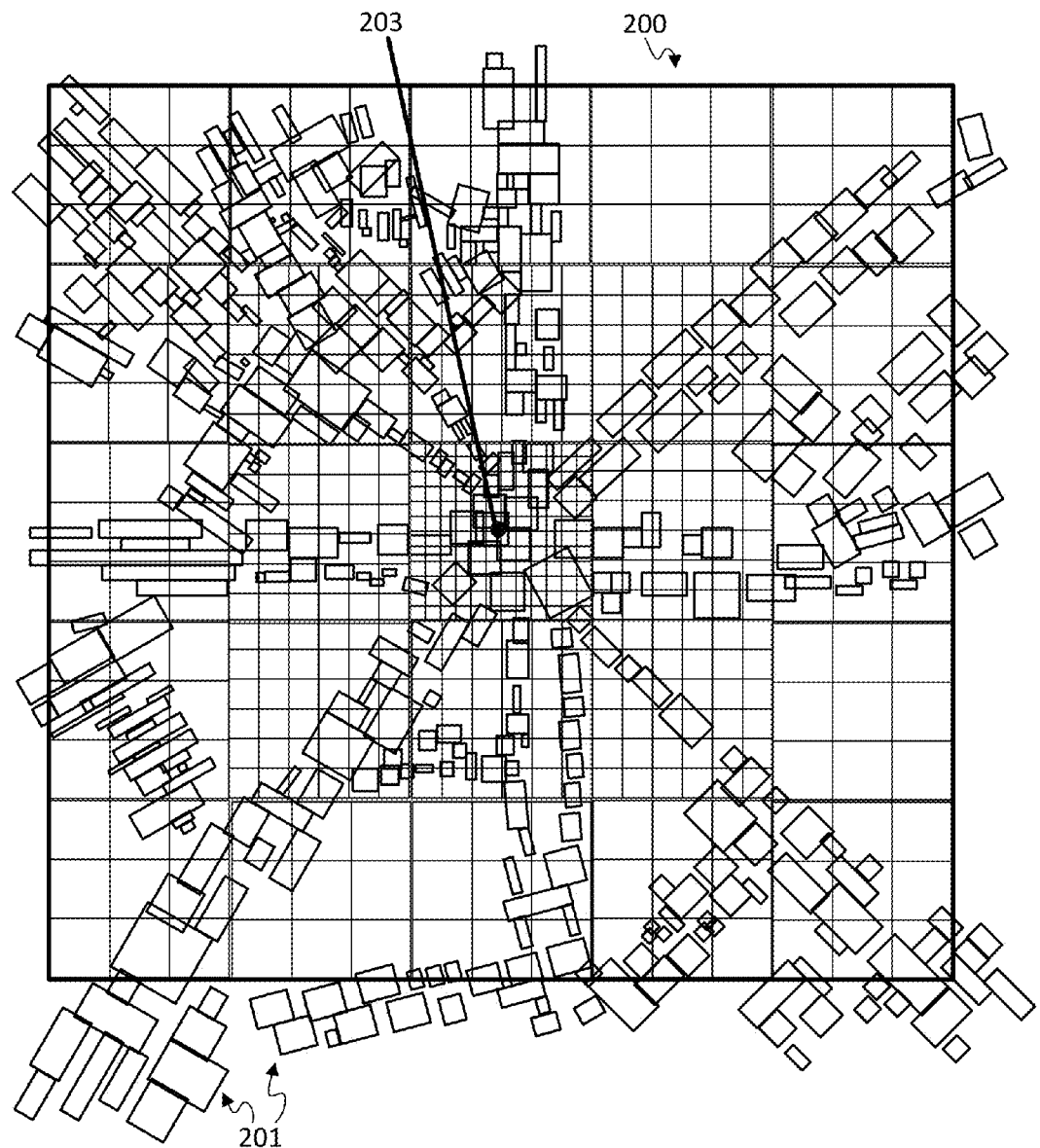
FIG. 2 illustrates a graphical view of a variable density depthmap.

FIG. 2 illustrates a graphical view of a variable density depthmap 200. The variable density depthmap 200 is shown against an example layout of buildings 201. The buildings 201 are not part of the variable density depthmap 200. The buildings 201 are shown for illustrative purposes only. The variable density depthmap 200 is constructed from the perspective of a user or navigation device 100 located at point 203. The variable density depthmap 200 includes a plurality of cells. The cells may be sized based on a distance from the point 203.

Figure 3:
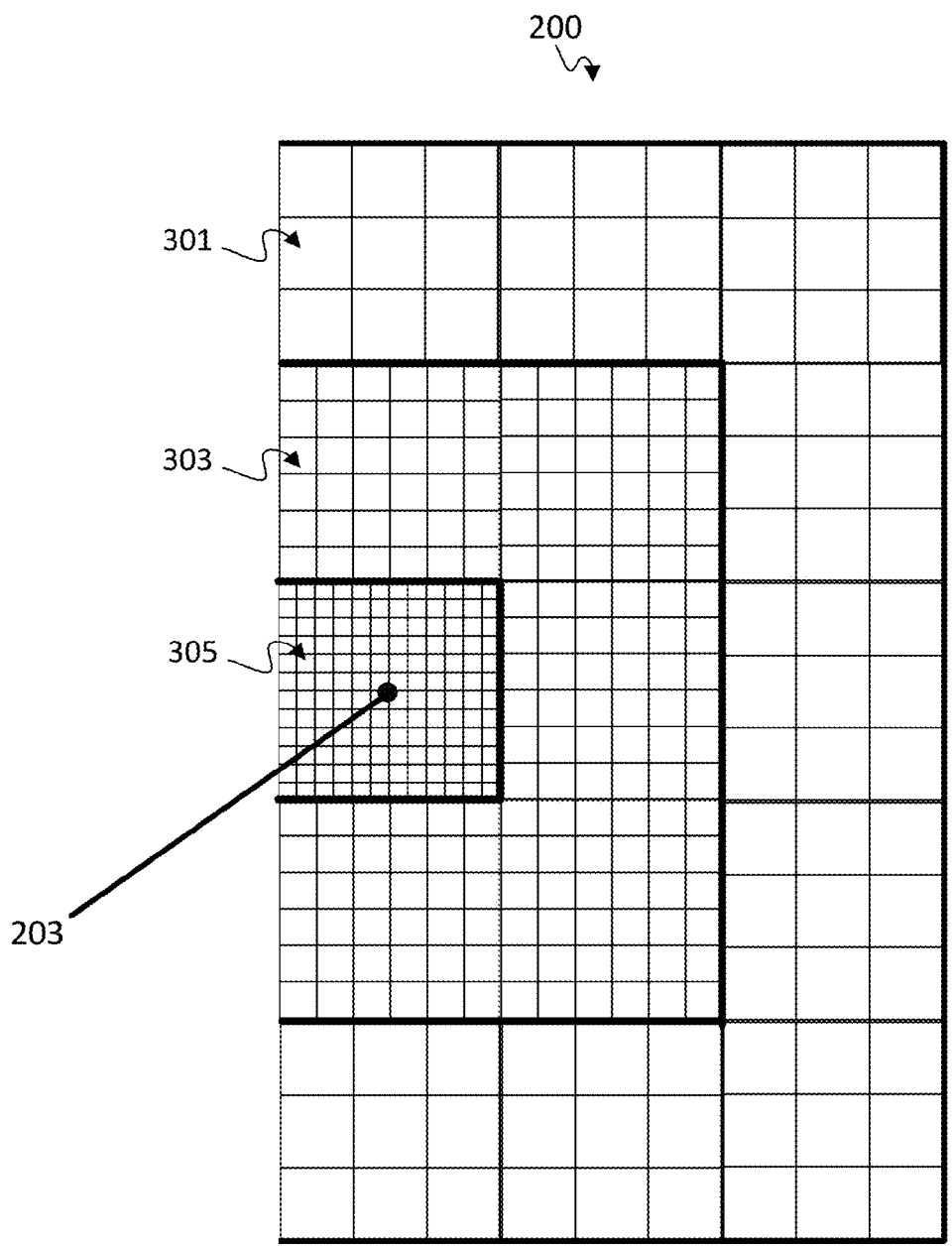
FIG. 3 illustrates a partial view of the variable density depthmap of FIG. 2.

FIG. 3 illustrates a partial view of the variable density depthmap 200 of FIG. 2. The cells closest to point 203, which are shown as a first level of cells 305, are within a first predefined distance from the point 203. The second level of cells 303 encircle or surround the first level of cells 305. The second level of cells 303 are greater than the first predefined distance from the point 203 but less than a second predefined distance from the point 203. The third level of cells 301 encircle or surround the second level of cells 303. The third level of cells 301 is greater than the second predefined distance from the point 203. The third level of cells 301 is less dense than the second level of cells 303, which is less dense than the first level of cells 305.

As illustrated by FIGS. 2 and 3, cells 303 are larger than cells 305 with respect to geographic area. Points of interests that correspond to geographic locations are associated with a cell. In the first level of cells 305, most buildings span across multiple cells. Points of interest in the same building may be associated with different cells, and accordingly, displayed on navigation device 100 at different locations on the screen. In the second level of cells 303, some buildings may span multiple cells but most are limited to a single cell. Points of interest in the same building are less likely to be associated with different cells, and accordingly, may be displayed on the navigation device 100 at the same or nearby locations on the screen even though they are geographically spaced apart. In the third level of cells 301, some buildings share a single cell. Points of interest in different buildings may be associated with a single cell, and displayed at a single location by navigation device 100.

The relative relationship between buildings 201 and the variable density depthmap 200 shown in FIG. 2 is just one example. The first level of cells 305 may be smaller. For example, each cell may be a size suitable to distinguish between adjacent store fronts (e.g., 1 ft, 1 m., 10 ft). The third level of cells 301 may be a larger scale. For example, each cell may be city blocks (e.g., 2 blocks, 10 blocks) or miles (e.g., 1 mile, 10 mile) across.

The variable density depthmap 200 may also be used in indoor maps of indoor environments (e.g., shopping mall, convention center, etc.) or in a hybrid outdoor and indoor environment (e.g., fairgrounds, amusement park, etc.). Each of the first level of cells 305, the second level of cells 303, and the third level of cells 301 may be associated with locations and objects in the indoor environment. For example, in a shopping mall, the stores closest to the navigation device 100 may be associated with the first level of cells 305 to provide precise placement of objects on the navigation device 100, while the more distant stores or even out of line of sight stores may be associated with the second level of cells 303 or the third level of cells 301. Alternately, the first level of cells 305 may be associated with the indoor environment and the second level of cells 303 and/or third level of cells 301 may be associated with an adjacent outdoor environment.

In another example, the variable density depthmap 200 may be constructed according to a linear relationship. The size of a cell may be selected as a function of the distance from the location of the navigation device 100. The function may be a stepwise function so that the size of the cells changes in proportional intervals moving away from the location of the navigation device 100, as shown by the following example:

$$\text{Size} = 2^{\text{floor}((d+\frac{N}{2})/N)} \quad [\text{EQ 1}]$$

where d is the distance from the center, N is the distance across each level of cells in a direction from the center (In the example of FIGS. 2 and 3, N=12. EQ1 also assumes a minimum cell size of 1 unit, which could be adjusted with the addition of a constant. The center may be the location of the navigation device 100. The floor function, which also may be referred to as a truncation, maps the input to the largest integer not greater than the input. Equations EQ1 is based on square cells; however, the cells may be rectangular, circular, a circular segment, a circular sector, or any other shape.

In an alternative embodiment, the relative sizes of cells of the variable density depthmap 200 may be based on the number of objects or data points associated with the particular cell. The cells are sized larger in areas with relatively few objects and smaller in areas with relatively numerous objects. For example, each cell may include a predetermined number of objects. The objects may be sorted according to the location of the center point and new cells are created concentrically around the center point every predetermined number of objects. The cells may be cylindrically shaped in this manner or further divided over a predetermined angular range to approximate rectangular cells. The variable density depthmap 200 may be created by indexing depth values using a spatial data structure, such as a k-dimensional (k-d) tree, quadtree, or any binary tree or other data tree structure. The spatial data structure partitions a two or three dimensional space by recursively subdividing the space into regions. For example, the k-d tree is a binary tree in which every node is a k-dimensional point. The k-d tree iteratively bisects the search space into two regions containing half of the points of the parent region. This subdivision stops when a predetermined cell size is reached. The k-d tree allows an efficient and quick look up to find a location in the depthmap. The spatial data structure tree defines the cells which are used to process the points when creating the depthmap. In this case, the spatial data structure tree is built by subdividing the region from the center 203 to the maximum distance into cells each half the size of the parent. At each level of recursion, the distance from the cell's center to the depthmap center 203 is checked. When the distance equals the minimum for that distance to the depthmap center 203, the division stops.

In another alternative embodiment, the variable density depthmap 200 may be created by processing all LIDAR points less than a maximum distance from the center point. A point is inserted into the variable density depthmap 200 into a large cell. If another point is added that falls within the cell, the cell is divided into two cells. Additional points are inserted or discarded based on the distance from the center point and the population of particular cell. For example, all points less than the maximum distance from the depthmap center 203 are processed using a spatial data structure. The spatial data structure classifies the point to determine what cell the point is to be inserted into. The level of the cell may be 0 (corresponding to the first level of cells 305), 1 (corresponding to the second level of cells 303), 2 (corresponding to the third level of cells 301), and so on. If the level of the cell is 0, then the point is inserted into the depthmap in the first level of cells. If the level is greater than 0, then the point is inserted if the cell contains less than the maximum number of points for each cell at that level. If the number of points in the cell is greater than the maximum, the point is not added to the depthmap.

In addition, the variable density depthmap 200 may vary over time by progressive refinement. For example, one depth value per cell may be used initially. As time progresses, the additional depth values are added to provide a higher resolution to the depthmap. This allows the navigation device 100 to quickly load the variable density depthmap 200 with one or more low resolution portions and update the variable density depthmap 200 with more accurate depth values as the resources become available or as time passes.

Figure 4:
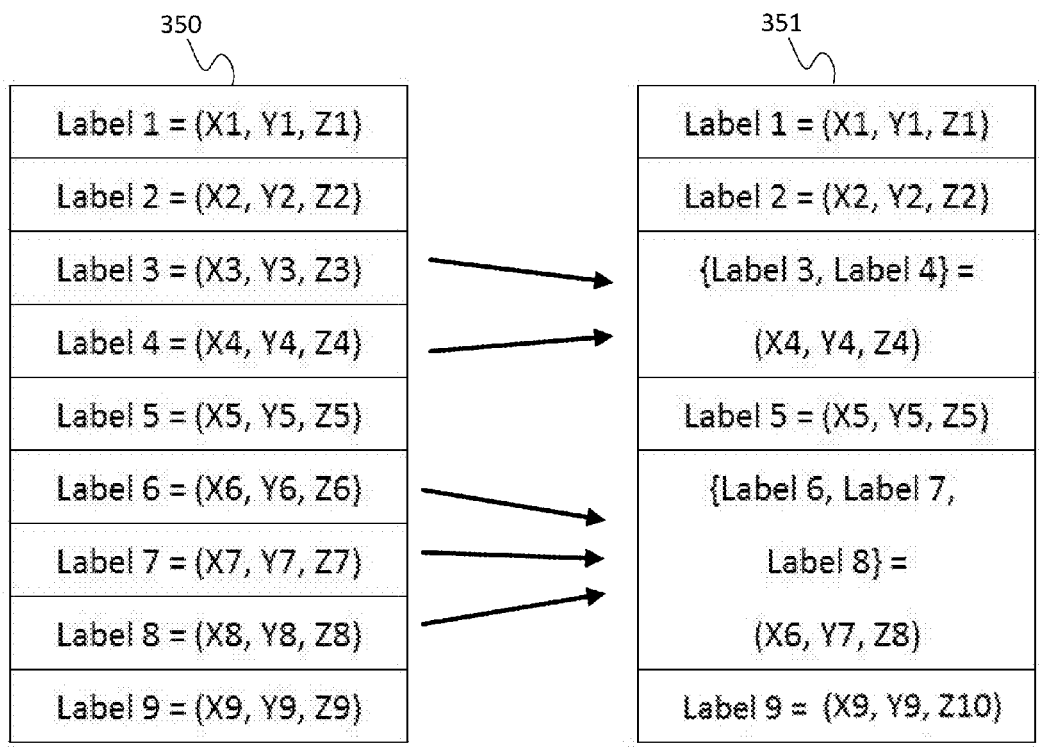
FIG. 4 illustrates a comparison of a constant density depthmap and a variable density depthmap.

FIG. 4 illustrates a comparison of a constant density depthmap 350 and a variable density depthmap 351. In the constant density depthmap 350, each cell is the same size. That is, each cell includes the same number of data points, which may be labels, points of interest, or other objects, in relation to the two or three dimensional geographic area. However, in the variable density depthmap 351 some cells include a different number of data points. For example, Label 3, which corresponds to location (X3, Y3, Z3), and Label 4, which corresponds to location (X4, Y4, Z4), are binned to single cell in the variable density depthmap 351, which, in this example may be displayed near (X4, Y4, Z4), which may or may not be the same as the locations corresponding to Labels 3 and Label 4 in the constant density depthmap. In another example, Labels 6, 7, and 8, corresponding to three different locations, are binned to a single cell. The labels are displayed at location (X6, Y7, Z8), which does not precisely match the actual location associated with any of the labels but is an estimated location suitable for Labels 6, 7, and 8 based on the distances from the actual locations and the user or navigation device 100. Even when only one label is included in a particular cell in the variable density depthmap 351, the cell location may not precisely match the actual location associated with the label. For example, Label 9 corresponds to a location (X9, Y9, Z9), which may be displayed at estimated location (X9, Y9, Z10).

Figure 5:
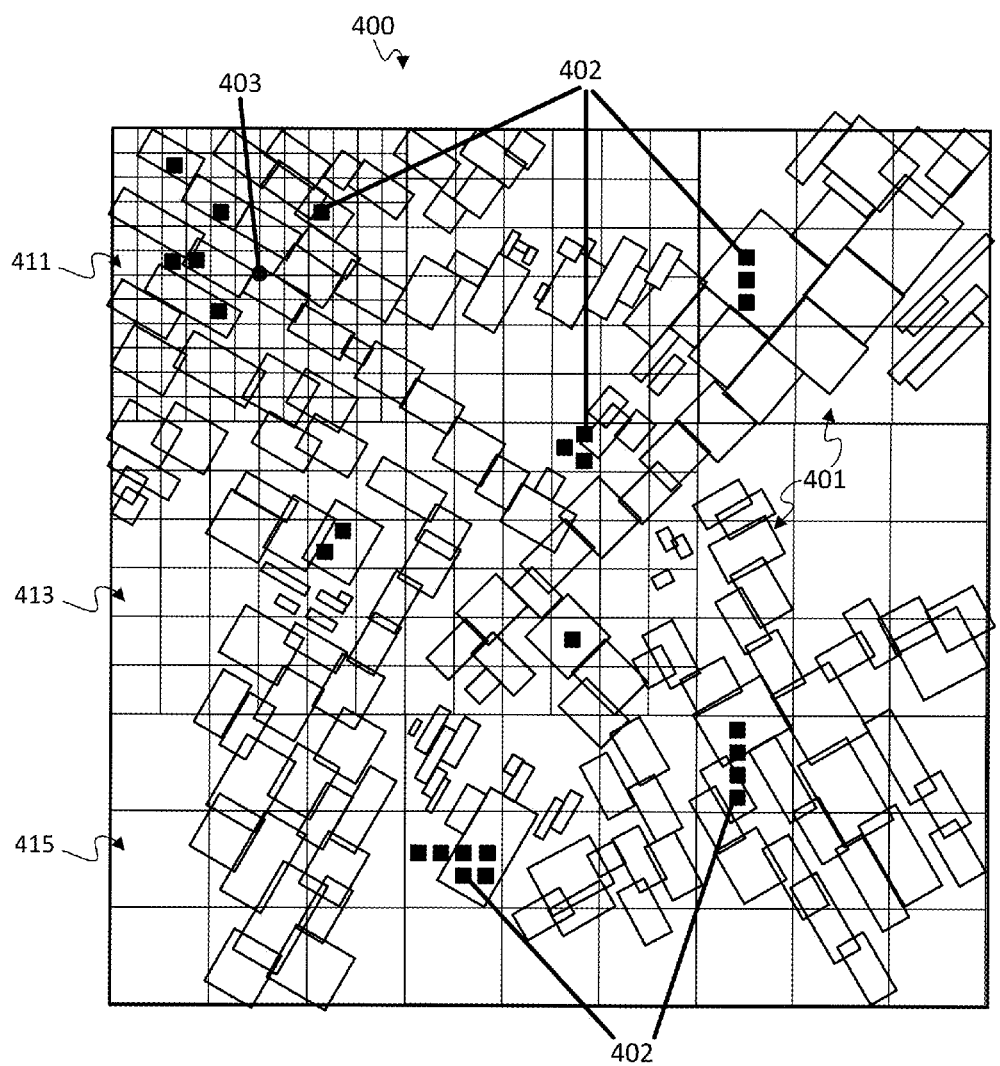
FIG. 5 illustrates another graphical view of a variable density depthmap.

FIG. 5 illustrates another graphical view of a variable density depthmap 400. In one example the variable density depthmap 400 may be a zoomed in view of the variable depthmap 200 shown in FIG. 2. The variable density depthmap 400 is shown against an example layout of buildings 401 for illustrative purposes. The buildings 201 are not part of the depthmap 400. The variable density depthmap 400 includes a plurality of data points 402, which may be objects, labels, or points of interest that correspond to the buildings 401.

The first level of cells 411 is within a first distance from a center point 403, which corresponds to the location of the navigation device 100. In the example shown in FIG. 5, the first level of cells 411 is sized such that no more than one data point 403 is associated with each cell. When displayed by the navigation device 100, the data points 403 in the first level of cells 411, are shown precisely at the respective geographic location associated with the data points 403.

The second level of cells 413 is positioned at a distance greater than the first distance from the center point 403 and less than a second distance from the center point 403. Each cell in the second level of cells 413 covers a greater area than each of the first level of cells 411. When more than one of the plurality of data points 402 are within the increased area of the second level of cells, one cell includes the more than one data points 402, which would not occur if the second level of cells 413 were sized similarly to the first level of cells 411. Likewise, the third level of cells 415 is positioned at a distance greater than the second distance from the center point 403 and less than a maximum distance from the center point 403 to be included in the variable density depthmap 400. As shown in FIG. 5, the cells in the third level of cells 415 may include as many as four or five data points 402 or more.

Figure 6:
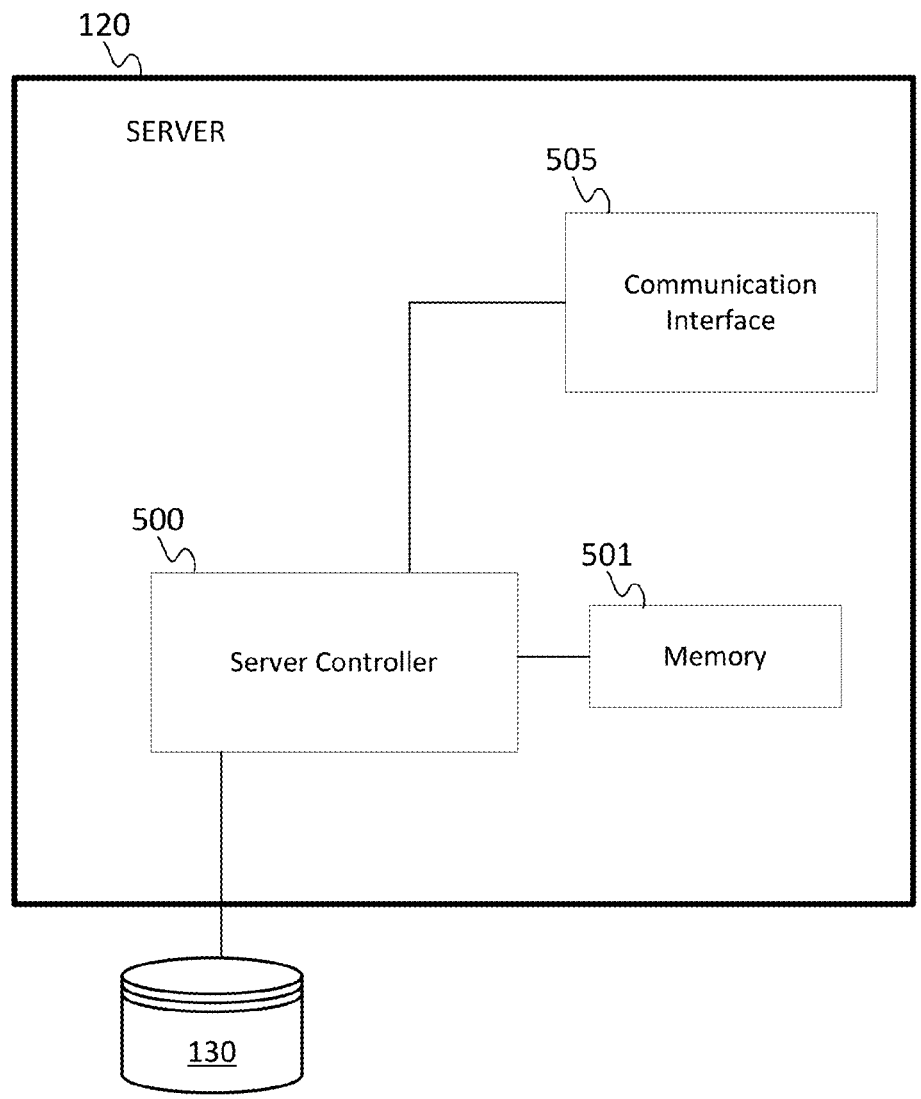
FIG. 6 illustrates a detailed view of the server of FIG. 1.

FIG. 6 illustrates a detailed view of server 120. The server 120 is an apparatus for organizing spatial data. The server 120 includes a server controller 500, a memory 501, and a communication interface 505. The database 130 may be external or internal to the server 120. The memory 501 and/or database 130 is configured to store a plurality of objects. The objects may be labels identifying points of interests such as businesses, street names, buildings, landmarks, etc. More specifically, the objects may identify types of businesses or types of locations such as gasoline stations, office locations, indoor locations, hotels, restaurants, museums, stadiums, offices, automobile dealerships, auto repair shops, stores, parks, etc. The objects may include data identifying broader locations such as states, cities, towns, counties or other communities. The objects may identify geographic features, such as bodies of water, mountain ranges, etc. Each of the objects are associated with a two dimensional coordinate system (latitude and longitude) or a three dimensional coordinate system (latitude, longitude, and altitude) to index the objects by location.

The database 130 may be maintained by a map developer, such as NAVTEQ North America, LLC located in Chicago, Ill. The map developer may collect geographic data to generate and enhance the database 130. The database 130 may be stored in an Oracle spatial format or other spatial format, such as for development or production purposes. The Oracle spatial format or development/production database may be compiled into a delivery format, such as a geographical data format (GDF) format or a physical storage format (PSF).

The communication interface 505 is configured to receive a location data point from a mobile device such as navigation device 100. The server controller 120 calculates a distance from each of the plurality of objects to the location data point using either the two dimensional coordinate system or the three dimensional coordinate system. The server controller 120 constructs the variable density depthmap 200 by associating each of the plurality of objects with one of a plurality of cells of the variable density depthmap according to the distance.

The memory 501 stores one or more predetermined distances to define the variable density depthmap 200. The server controller 120 compares the distance of each of the plurality of objects with a first predetermined distance. Each of the plurality of objects less than the first predetermined distance from the location data point is associated with a first type of cell, which may be one of the cells of the first level of cells 305. Each of the plurality of objects greater than the first predetermined distance is associated with a second type of cell, which may be one of the cells of the second level of cells 303. The second type of cell corresponds to a larger geographic area than the first type of cell.

The server controller 120 may be configured to utilize any number of cutoff distances. For example, as shown in FIGS. 2 and 5, a first predetermined distance and a second predetermined distance are used. The server controller 120 compares the distance of each of the plurality of objects with a first predetermined distance. Each of the plurality of objects less than the first predetermined distance from the location data point is associated with a first type of cell, which may be one of the cells of the first level of cells 305. The server controller 120 compares the distance of each remaining plurality of objects with a second predetermined distance. Each of the plurality of objects greater than the first predetermined distance and smaller than the second predetermined distance is associated with a second type of cell, which may be one of the cells of the second level of cells 303. Each of the plurality of objects greater than the second predetermined distance is associated with a third type of cell, which may be one of the cells of the third level of cells 301. The third type of cell is larger than the second type of cell, which means the third type of cell corresponds to a larger geographic area than the second type of cell. The server controller 120 may also compare the distances of the plurality of objects to a preliminary distance to determine whether the object is associated with the variable density depthmap 200 at all or is out of range of the navigation device 100 at the current location.

Figure 7:
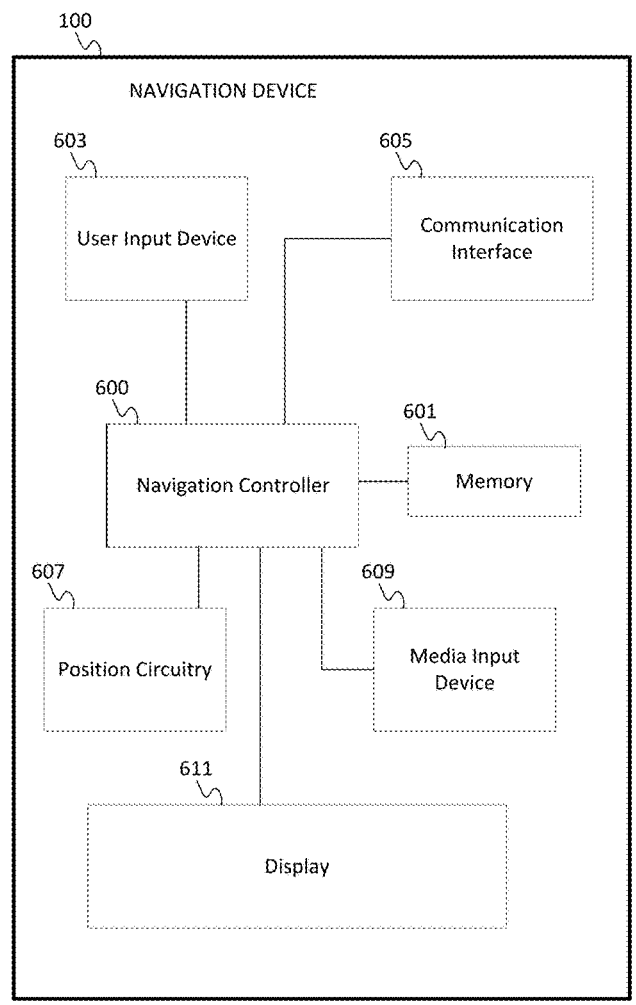
FIG. 7 illustrates a detailed view of navigation the device of FIG. 1.

FIG. 7 illustrates a detailed view of navigation device 100. The navigation device 100 is an apparatus for organizing spatial data. The navigation device 100 includes a navigation controller 600, a memory 601, a communication interface 605, and position circuitry 607. The navigation device 100 may also include a user input device 603, a media input device 609, and a display 611.

In the server-based embodiment above, the position circuitry 607 determines a current geographic position of the navigation device 100 and the communication interface 605 sends the current geographic position to the server 120. The server 120 constructs the variable density depthmap 200 and connects the variable density depthmap with a panoramic image based on the current geographic position of the navigation device 100 to appropriately position objects on the panoramic image, which is sent to the navigation device 100 for display.

In an alternative, user device-based embodiment, the navigation device 100 constructs the variable density depthmap 200. The position circuitry 607 determines location data including the position and/or the orientation of the navigation device 100. The location data may be generated using one or more of a global navigation satellite system based on a satellite signal (such as Global Positioning System (GPS), the Russian GLONASS or European Galileo), a triangulation system that utilizes one or more terrestrial communication signals, a inertial position system based on relative position sensors such as gyroscopes, accelerometers, and altimeters, and/or a or dead reckoning system based on a previously known position. The orientation may be determined using any of the above systems and/or a magnetic sensor such as a compass or a three dimensional magnetic sensor array. Magnetic sensors determine the direction and or strength of a magnetic field and can be used to determine heading or orientation. Inertial sensors such as accelerometers and gyroscopes measure acceleration, which can be used to calculate position, orientation, and velocity (direction and speed of movement) of the navigation device 100.

The location data is sent to the navigation controller 600, which constructs the variable density depthmap 200. The navigation controller 600 identifies a plurality of data points indexed by a distance from the location data point determined by the position circuitry 607. The navigation controller 600 compares the distance from each of the plurality of data points to the location data point. Data points within a minimum distance from the location data point are binned in one of a plurality of high resolution cells and data points greater than the minimum distance from the location data point are binned into one of a plurality of low resolution cells. The variable density depthmap 200 is constructed from the plurality of low resolution cells and the plurality of high resolution cells.

In the user device-based embodiment, the memory 601 stores depthmap data. The depthmap data comprises geographic coordinates paired with objects. The navigation controller 600 accesses the location, which may include a single location data point, from the memory 601. Alternatively, the geographic coordinates paired with objects may be received through media input device 209 via an external storage medium or wired or wireless communication through the communication interface 605.

The navigation controller 600 selects a street view image or street view level map based on the location data. The street view image is combined with the variable position depthmap 200 in order to position objects or points of interest within the street view image. Objects far from the navigation device 100 are less accurately positioned than objects near the navigation device 100 because the depthmap cells in the background of the street view image have a lower resolution than the depthmap cells in the foreground of the street view image. The navigation controller 600 sends the variable density depthmap 200 or the street view image combined with the variable density depthmap to the display 611.

The user input device 603 receives a command from a user to turn on the navigation device 100 or to activate the algorithm for organizing spatial data by constructing variable density depthmap. The user input device 603 includes one or more buttons, keypad, keyboard, mouse, stylist pen, trackball, rocker switch, touch pad, voice recognition circuit, or other device or component for inputting data to the navigation device 100. The user input device 603 and the display 611 may be combined as a touch screen, which may be capacitive or resistive. The display 611 may be a liquid crystal display (LCD) panel, light emitting diode (LED) screen, thin film transistor screen, or another type of display.

The navigation controller 600 or server controller 500 may include a general processor, digital signal processor, an application specific integrated circuit (ASIC), field programmable gate array, analog circuit, digital circuit, combinations thereof, or other now known or later developed processor. The navigation controller 600 or server controller 500 may be a single device or combinations of devices, such as associated with a network, distributed processing, or cloud computing.

The memories 501, 601 may be a volatile memory or a non-volatile memory. The memory 501, 601 may include one or more of a read only memory (ROM), random access memory (RAM), a flash memory, an electronic erasable program read only memory (EEPROM), or other type of memory. The memory 501, 601 may be removable from the navigation device 100, such as a secure digital (SD) memory card.

The communication interfaces 505, 605 may include any operable connection. An operable connection may be one in which signals, physical communications, and/or logical communications may be sent and/or received. An operable connection may include a physical interface, an electrical interface, and/or a data interface. The communication interfaces 505, 605 provides for wireless and/or wired communications in any now known or later developed format.

In an alternative embodiment, the navigation device 100 may omit the position circuitry 607 or use of the position circuitry 607. In this alternative embodiment, the navigation device 100 may be a personal computer, which encompasses desktops, laptops, and other computer processing platforms. Instead of a location determined by the position circuitry 607, the depthmap is constructed based on a location data point (focal geographical point) selected within a navigation application such as a street view application. The user may select the point using the user input device 603. The navigation controller 600 receives the location data point from the navigation application. The navigation controller 600 may also receive an orientation from the navigation application. The navigation controller 600 constructs the variable density depthmap according to the location data point and optionally the orientation in a manner similar to the other embodiments discussed herein.

Figure 8:
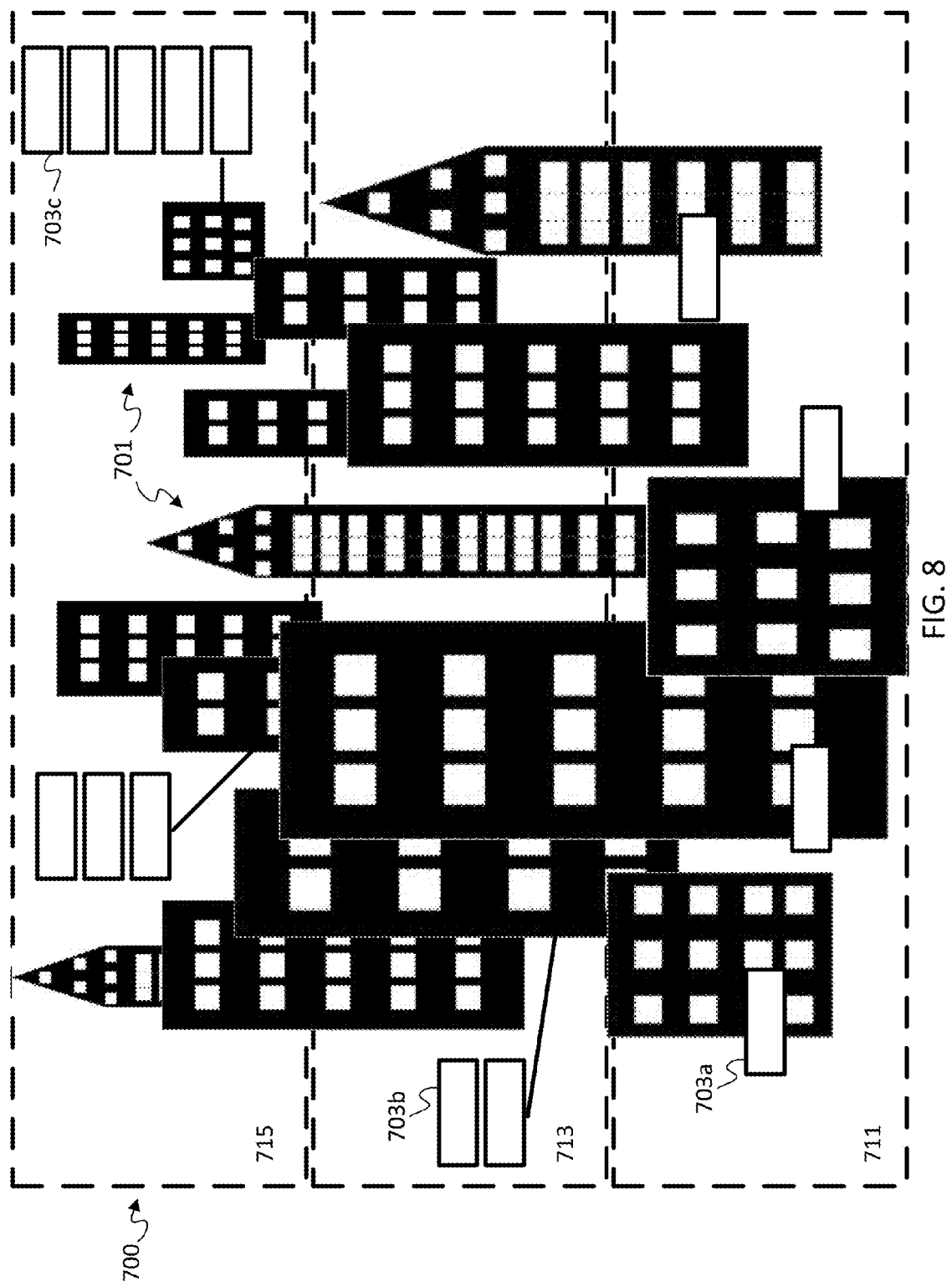
FIG. 8 illustrates a panoramic image incorporating a variable density depthmap.

FIG. 8 illustrates a panoramic or street view image 700 incorporating a variable density depthmap. The street view image 700 includes buildings 701 and objects 703. As the buildings 701 are located farther from the position of the navigation device 100, the buildings 701 appear smaller on display 611. Similarly, the objects are displayed relatively closer together as the locations of the objects are father from the position of the navigation device.

The street view image 700 is divided into a plurality of regions, as shown by dotted lines in FIG. 8. The dotted lines do not appear in the street view image but are shown to illustrate the variable density depthmap. A nearby region 711 may correspond to the first level of cells 305 shown in FIG. 3. A plurality of nearby objects 703a in the nearby region 711 are positioned relatively farther apart because the depthmap is at a high density in the nearby region 711. The nearby objects 703a are positioned close to the actual physical positions of the underlying points of interest.

An intermediate region 713 may correspond to the second level of cells 303. A plurality of intermediate objects 703b in the intermediate region 703 are positioned at a medium density to approximate the actual physical positions of the underlying points of interest. A distant region 715 may correspond to the third level of cells 301. A plurality of distant objects 703c in the distant region 715 are positioned in the same cell in the variable density depthmap and accordingly, are displayed stacked or clustered around the same location in the street view image 700.

Figure 9:
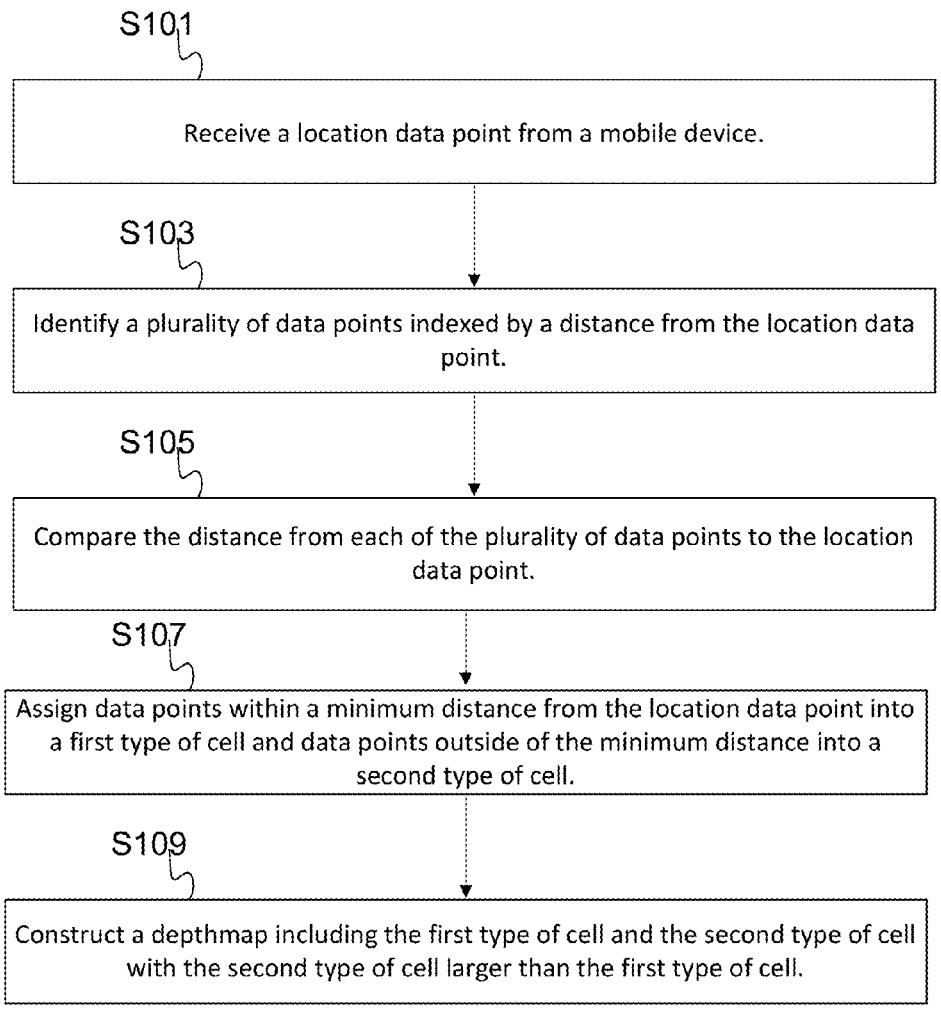
FIG. 9 illustrates a flowchart for constructing a variable density depthmap.

FIG. 9 illustrates a flowchart for an algorithm for constructing a variable density depthmap. Fewer, more, or different steps or acts may be provided, and a combination of steps may be provided. Also, the steps or acts may be performed in the order as shown or in a different order. The method is implemented by the system and/or devices described herein or by different devices or systems.

As discussed above, either the server controller 500 or the navigation controller 600 may execute the algorithm for constructing a variable density depthmap. At act S101, the controller receives a location data point from a navigation device, which may be a mobile device. The location data point may include geographical coordinates and may be determined using GPS, cellular positioning, or a combination.

At act S103, the controller identifies a plurality of data points indexed by a distance from the location data point. The data points may include object information that defines a point of interest and associates the point of interest with a particular location. The plurality of data points may be all objects within a preliminary threshold distance from the location data point.

At act S105, the controller compares the distance from each of the plurality of data points to the location data point. In act S107, data points are assigned to various cells. The various cells include a plurality of types of cells, which may be defined as corresponding to different sizes of geographical area. The data points may be assigned to the plurality of types of size according to distance from the location data point. For example, data points within a minimum distance from the location data point may be assigned to a first type of cell and data points greater than the minimum distance from the location data point into a second type of cell. Any number of types of cells may be used. For example, data points farther than a second minimum distance may be assigned to a third type of cells.

At act S109 the controller constructs a depthmap including the plurality of types of cells, which may include at least one of the first type of cell and the second type of cell, with the second type of cell is larger than the first type of cell. Accordingly, the second type of cell covers a larger geographic area than the first type of cell. Likewise, the portion of the depthmap including the first type of cell is at a higher resolution than the portion of the depthmap including the second type of cell.

The controller that constructs the depthmap at act S109 may be either the server controller 500 or the navigation controller 600. The navigation controller 600 may be in a mobile device and/or any device running a map or navigation application. In addition to the location data point, the controller may receive orientation data. The orientation data may be automatically detected using position circuitry 607 or determined based on a user input to the map or navigation application. The controller determines a map based on the location data point and the orientation data. The controller associates the map with the depthmap, which may be an overlay, in order to display the data points and/or object information on the navigation device 100. In the server-based embodiments, the depthmap and map may be sent together to the navigation device 100 from the server 120. In the user device-based embodiments, the depthmap and map may be sent together to the display 611 from the navigation controller 600.

Compared to conventional depthmaps, variable density depthmaps contain less data. In the application of panoramic or street level view images, unnecessary depth information is removed for locations in the background of the image. Placement of points of interest in the background of the image is less precise, but in exchange for valuable savings in data storage, processing power, processing time, and communication resources. Variable density depthmaps require less time to serve over a network and less time to decode, which provides the application more quickly to the user.

The embodiments described above may be implemented using computer executable instructions stored in the memory 501 and/or the memory 601, which are non-transitory. The processors may execute computer executable instructions. The computer executable instructions may be written in any computer language, such as C++, C#, Java, Pascal, Visual Basic, Perl, HyperText Markup Language (HTML), JavaScript, assembly language, extensible markup language (XML) and any combination thereof.

The computer executable instructions may be logic encoded in one or more tangible media or one or more non-transitory tangible media for execution by the processors. Logic encoded in one or more tangible media for execution may be defined as instructions that are executable by the processors and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The computer readable instructions may be stored on any non-transitory computer readable medium. A non-transitory computer readable medium may include, but are not limited to, a floppy disk, a hard disk, an ASIC, a compact disk, other optical medium, a random access memory (RAM), a read only memory (ROM), a memory chip or card, a memory stick, and other media from which a computer, a processor or other electronic device can read.

As used herein, the phrases "in communication" and "couple" are defined to mean directly connected to or indirectly connected through one or more intermediate components. Such intermediate components may include both hardware and software based components.

Various embodiments described herein can be used alone or in combination with one another. The foregoing detailed description has described only a few of the many possible implementations of the present invention. It is intended that the foregoing detailed description be regarded as illustrative rather than limiting and that it is understood that the following claims including all equivalents are intended to define the scope of the invention.

We claim:

1. A method for organizing spatial data, the method comprising:
    receiving a location data point from a navigation device;
    identifying a plurality of data points indexed by a geographic distance from the location data point;
    comparing the geographic distance from each of the plurality of data points to the location data point;
    assigning at least one of the plurality of data points within a minimum distance from the location data point into a first cell;
    assigning a subset of the plurality of data points greater than the minimum distance from the location data point into a second cell, wherein the subset of the plurality of data points comprises two or more data points;
    constructing a depthmap including the first cell and the second cell, wherein the second cell is geographically larger than the first cell; and
    sending the depthmap for display on the navigation device.

2. The method of claim 1, wherein the depthmap is constructed as a k dimensional tree.

3. The method of claim 1, wherein each of the plurality of data points indicates a location of a point of interest.

4. The method of claim 1, further comprising:
    receiving orientation data from the navigation device; and
    determining a map based on the location data point and the orientation data.

5. The method of claim 4, further comprising:
    associating the map with the depthmap, wherein sending the depthmap for display on the navigation device comprises sending the map associated with the depthmap for display on the navigation device.

6. The method of claim 5, wherein the map is a street level view map.

7. The method of claim 1, wherein the at least one of the plurality of data points is a single data point.

8. An apparatus for organizing spatial data, the apparatus comprising:
a memory configured to store a plurality of objects indexed by location;
a communication interface configured to receive a location data point from a navigation device; and
a controller configured to calculate a distance from each of the plurality of objects to the location data point and construct a variable density depthmap by associating each of the plurality of objects with one of a plurality of cells of the variable density depthmap according to the distance,
wherein at least one of the plurality of objects less than a predetermined distance from the location data point is associated with a first cell of the plurality of cells and at least one of the plurality of objects greater than the predetermined distance from the location data is associated with a second cell of the plurality of cells, and
wherein the second cell corresponds to a larger geographic area than the first cell.

9. The apparatus of claim 8, wherein the communication interface is configured to send the variable density depthmap to the navigation device.

10. The apparatus of claim 8, wherein the variable density depthmap is constructed as a k dimensional tree.

11. The apparatus of claim 8, wherein each of the plurality of objects includes a point of interest.

12. The apparatus of claim 8, wherein the communication interface is configured to receive orientation data from the navigation device and the plurality of objects are selected based on the location data point and the orientation data.

13. The apparatus of claim 8, wherein the processor is configured to associate a panoramic image with the variable density depthmap.

14. The apparatus of claim 13, wherein the plurality of objects are positioned with the panoramic image according to the variable density depthmap.

15. The apparatus of claim 8, wherein at least one of the plurality of objects greater than a second predetermined distance from the location data point is associated with a third cell of the plurality of cells and the third cell corresponds to a larger geographic area than the second cell.

16. A non-transitory computer readable medium configured to store a computer program configured to organize spatial data, the program comprising instructions to:
receive a location data point from a mobile device;
identify a plurality of points of interest indexed by a distance from the location data point;
compare the distance from each of the plurality of points of interest to the location data point;
assign at least one of the plurality of points of interest within a minimum distance from the location data point into one of a plurality of high resolution cells;
assign at least one of the plurality of points of interest greater than the minimum distance from the location data point into one of a plurality of low resolution cells;
construct a depthmap including the plurality of low resolution cells and the plurality of high resolution cells; and
send the depthmap to the mobile device.

17. The non-transitory computer readable medium of claim 16, the program comprising instructions to:
receive orientation data from the mobile device;
determine a panoramic view based on the location data point and the orientation data; and
position the points of interest in the panoramic view.

18. The non-transitory computer readable medium of claim 16, the program comprising instructions to:
position the points of interest in a street level view image.

19. The non-transitory computer readable medium of claim 16, wherein the depthmap is constructed as a k dimensional tree.

* * * * *